United States Patent [19]

Kirk

[11] Patent Number: 4,597,559
[45] Date of Patent: Jul. 1, 1986

[54] DIAPHRAGM VALVE

[75] Inventor: Kenneth L. Kirk, Cranston, R.I.

[73] Assignee: Amtrol Inc., West Warwick, R.I.

[21] Appl. No.: 719,065

[22] Filed: Apr. 2, 1985

[51] Int. Cl.[4] .............................................. F16K 7/16
[52] U.S. Cl. .................. 251/144; 251/331; 251/367
[58] Field of Search ........................ 251/331, 144, 367

[56] References Cited

U.S. PATENT DOCUMENTS

| | | | |
|---|---|---|---|
| 2,388,988 | 11/1945 | Mueser | 251/24 |
| 2,388,989 | 11/1945 | Mueser | 251/24 |
| 2,679,378 | 5/1954 | Uhler | 251/331 |
| 2,767,956 | 10/1956 | Rubin | 251/331 |
| 2,892,613 | 6/1959 | Boteler | 251/331 |
| 3,157,383 | 11/1964 | Price | 251/331 |
| 3,426,999 | 2/1969 | Toinet | 251/331 |
| 3,802,462 | 4/1974 | Trösch | 137/556 |
| 4,014,514 | 3/1977 | Priese et al. | 251/331 |
| 4,029,296 | 6/1977 | Hartmann et al. | 251/331 |
| 4,353,243 | 10/1982 | Martin | 73/23.1 |
| 4,376,523 | 3/1983 | Goyen | 251/61.1 |

FOREIGN PATENT DOCUMENTS

| | | | |
|---|---|---|---|
| 535669 | 2/1955 | Belgium | 251/331 |
| 1106309 | 7/1955 | France | 251/331 |
| 465337 | 2/1950 | Italy | 251/331 |
| 599693 | 11/1959 | Italy | 251/331 |
| 260881 | 11/1926 | United Kingdom | 251/331 |
| 459054 | 12/1936 | United Kingdom | 251/144 |

Primary Examiner—Arnold Rosenthal
Attorney, Agent, or Firm—Fisher, Christen & Sabol

[57] ABSTRACT

In combination, a pressurized-gas container having a port and a diaphragm valve having a hollow elongated body. A flexible diaphragm is sealingly positioned in the valve. The diaphragm forms a first chamber and a second chamber in the hollow valve. A valve stem is rotatably positioned in the first chamber. A port located in the side of the valve communicates with the second chamber. A short member, affixed in the port, has a central passageway. One end of the short member is adapted to be connected to a source of pressurized gas. A second elongated member, having a central passageway, is positioned in the second chamber of the valve. One end of the elongated member is sealingly affixed to the inside of the wall of the container around the port of the container. One end of the second elongated member forms a valve seat, which is positioned near but not in contact with the diaphragm. A cup member is positioned in the first chamber of the valve. The valve stem can be rotated into a closed position whereby the flat bottom of the cup member sealingly presses the diaphragm against the valve seat.

11 Claims, 2 Drawing Figures

DIAPHRAGM VALVE

BACKGROUND OF THE INVENTION

1. Field Of The Invention

The invention relates to diaphragm valves, particularly for containers for pressurized gas.

2. Prior Art

U.S. Pat. No. 2,388,988 (Mueser) teaches a valve combination which includes a flow passage having a seat and a diaphragm, having a central portion surrounded by an annular portion which is adapted to be flexed into and out of engagement with the seat to close and open the flow passage. The central portion of the diaphragm has a greater travel to the seat than the annular portion of a backing member engaging the central portion only of the diaphragm on the side remote from the seat. There is a manually operable stem rotatable to advance the backing member a distance commensurate with the travel of the central portion of the diaphragm in moving from open to closed position. An annular member surrounds the backing member and engages the annular portion of the diaphragm surrounding the central portion thereof. The backing member and the annular member each are movable with respect to the other. There is means responsive to the rotation of the stem to advance the annular member a distance commensurate with the lesser travel of the annular portion of the diaphragm.

U.S. Pat. No. 2,388,989 (Mueser) discloses a valve combination which includes a flow passage having a seat, and a diaphragm which is adapted to be flexed into and out of engagement with the seat to open and close the flow passage and of a diameter, relative to the diameter of the seat such that an annular portion of the diaphragm outside the bounds of the seat is free to flex. A main backing member engages the central portion only of the diaphragm on the side remote from the seat. An auxillary backing member is adapted to engage the annular portion of the diaphragm outside of the bounds of the seat. The main backing member and the auxillary backing member each are movable with respect to the other. There is a rotatable stem and differential screw means actuated thereby to move the main backing member a distance commensurate with the travel of the central portion of the diaphragm in moving from open to closed position and the auxiliary backing member a distance commensurate with the lesser travel of the annular portion of the diaphragm. The screw means has oppositely threaded sections of unequal pitch.

U.S. Pat. No. 2,679,378 (Uhlet er al.) teaches a high pressure control valve which includes a first body member having an inlet passageway. There is a raised valve seat around the inner end of the inlet passageway. The first body member has an enlarged chamber which surrounds the valve seat and which is defined by the edge of a shoulder portion. A flexible diaphragm is seated on the shoulder portion and extends across the valve seat for closing the same. A second body member is connected with the first body member outside of the region of the shoulder portion and is engaged with the diaphragm to hold the same sealed upon the shoulder portion. There is a valve actuator movable axially in the second body member for moving the diaphragm against the valve seat. The actuator has a diameter greater than that of the valve seat. The valve seat and the shoulder portion defines an annular groove. The first body member has an outlet passageway opening into the groove. A spring is located between the diaphragm and the floor of the groove for lifting the diaphragm from the seat. The spring is a unit structure comprised of continuous outer and inner rings held in spaced relation by spoke-like connecting webs with arcuate perforations between the webs. The outer ring is downwardly curved between the webs and the inner ring is upwardly curved between the webs. The crests of the curved portions of the outer ring are seated in the groove and guided by the shoulder portion. The inner periphery of the inner ring has a diameter greater than that of the valve seat and less than that of the actuator. Thereby, upon closing movement of the actuator, the pressure therefrom acts on the diaphragm for seating the same upon the valve seat. It also acts through the diaphragm upon the crests of the curved portions of the inner ring for compressing the same and the curved portions of the outer ring toward flat form and into the groove.

U.S. Pat. No. 2,767,956 (Rubin) teaches a diaphragm-type valve which includes a diaphragm for closing the valve against a seat in the valve by the action of a valve stem. The diaphragm is composed of a thermoplastic polymer of trifluorochloroethylene having an N.S.T. between about 250° and about 350° C. plasticized with between about 15 and about 35 weight percent of a lower molecular weight oil fraction of a polymer of trifluorochloroethylene boiling between about 230° and about 400° F. at 1 mm. of mercury.

U.S. Pat. No. 2,892,613 (Boteler) discloses a diaphragm-type valve which has a compressor with a socket therein and which has connecting means with one portion in the socket overlying the rim of an aperture in the bottom thereof and with another portion extending slidably through the aperture and adapted to engage a diaphragm. There is a slot in the one connecting means portion and a key carried loosely in the slot. The socket has an ellipse-like cross section at the one connecting means portion. The key measured in a cross-sectional plane at the connecting means portion is shorter than the major axis of the ellipse-like cross section and is longer than the minor axis of the ellipse-like cross section. At least the portion of the key which is located within the slot is supported by the compressor in spaced relation with respect to the bottom of the slot.

U.S. Pat. No. 3,157,383 (Price) teaches a diaphragm valve which includes a diaphragm clamped at its margin between a bonnet, and a flat diaphragm clamping surface of which makes a rounded junction with the internal wall thereof. There is a valve casing having a substantially straight bore of substantially constant cross-sectional area and a seating formed in part by the surface of a lateral opening which forms a rounded sweep of large radius joining it to a flat diaphragm clamping surface on the valve casing which extends inwardly at a substantial taper. The tapering sides of the opening run smoothly into the cross-section of the bore which thereby completes the seating. The diaphragm, when free, corresponds to the closed position of the valve, except at its margin, which slopes in the same direction but less steeply than the tapering part. The diaphragm in the closed position of the valve is pressed by an actuator to which it is attached, against the seating inward of the rounded sweep and is slightly stretched in the region of the rounded sweep. When the valve is opened, the diaphragm is retracted by the actuator and forms an outward corrugation into the bonnet within the clamped margin. The actual clamping surface on the bonnet over most of the periphery lies outside of the line at which the clamping surface on the casing joins the rounded sweep but over a narrow zone on each side extends inward so that in these zones a greater radial width of the diaphragm is firmly clamped. The inward extension is not great enough to interfere with the correct formation of the outward corrugation when the valve is opened.

U.S. Pat. No. 3,426,999 (Toinet) discloses a diaphragm valve which includes a body having an inlet opening and an outlet opening and a valve seat between the inlet and outlet openings, a cap and cooperating flanges, by which the cap is detachably secured to the body. A diaphragm is peripherally secured between the flanges. There is a valve actuator for moving the diaphragm selctively away from the seat to open the valve and toward and into engagement with the seat to close the valve. The flanges have complementary opposed surfaces between which the edges of the diaphragm are clamped. The surfaces are annular and coaxial and are defined by figures of revolution about their common axis. The axis is perpendicular to the direction of fluid flow through the inlet and outlet openings. The surfaces are inclined radially inwardly toward the valve seat so that the surfaces are inclined both to their common axis and to the direction of fluid flow through the inlet and outlet openings. The flanges have flat opposed surfaces perpendicular to the axis radially outwardly beyond said annular surfaces. The fluid passageways through the valve are circular adjacent the inlet and outlet openings and become progressively more oval adjacent the seat. The diaphragm is spherically concave in the open valve position. The valve body has interior surfaces that are convexly curved along the longitudinal midplane of the valve and that terminate along the midplane in sharp edges at the diaphragm. The convex curve of the valve body merges smoothly into the concave curve of the diaphragm in a substantially continuous surface along the midlplane thereby to avoid any abrupt break in the continuous surface. The portions of the continuous surface on opposite sides of the seat form a large obtuse angle with each other to reduce turbulence in the fluid flowing through the valve.

U.S. Pat. No. 3,802,462 (Trosch) teaches a remotely operable and manually operable membrane valve for fluid media which includes a housing and a membrane stretched across the housings. Inlet and outlet openings are located at one side of the membrane in the housing. A separating ridge separates the inlet and outlet openings. Deflection of the membrane toward the separating ridge controls the flow of the fluid medium through the valve. There are means admitting a control fluid to the other side of the membrane to control deflection thereof, and a pressure cap. An upstanding bolt is secured to the membrane. A hollow, transparent, threaded spindle surrounding the bolt is located at the other side of the membrane and engages the pressure cap. The spindle is threaded in the housing, is accessible from outside of the housing and effects movement of the pressure cap toward the membrane to control deflection of the membrane toward and away from the separating ridge and to permit visual inspection of the position of the bolt and hence of the membrane.

U.S. Pat. No. 4,014,514 (Priese et al.) discloses a valve which includes a valve body defining inlet and outlet ports and a closure port communicating therewith, a valve bonnet fixed on the valve body over the closure port and a compressor reciprocable toward and away from the closure port. A flexible diaphragm overlies the closure port and is movable by the compressor into engagement with the closure port to block fluid flow through the closure port and alternatively is movable away from the closure port to permit progressively greater fluid flow through the closure port. An annular limit plate is secured between the valve bonnet and the valve body. The plate includes a first non-compressive centering means for centering the limit plate relative to the valve bonnet, and a second non-compressive centering means for centering the limit plate relative to the valve body. There is a central passage means which permits at least partial passage of the compressor through the plate. There is also an upper surface positioned for abutting engagement of compressor stop means to halt motion of the compressor toward the closure port at a predetermined distance from the closure port so as to prevent excessive crushing of the diaphragm interposed between the closure port and the compressor. There is a lower surface having a first concavity adapted to abuttively support a bulbous diaphragm shoulder portion. The radially interior edge of the first concavity is substantially aligned with the should of the compressor when the compressor and diaphragm are fully retracted into a valve in a fully-opened position. The compressor and limit plate thus provide a substantially completely abuttive and supportive structure for the diaphragm when the compressor and diaphragm are fully retracted into a valve opened position.

U.S. Pat. No. 4,029,296 (Hartmann et al.) teaches a diaphragm valve arrangement which includes a pair of clamping members having respective juxtaposed surfaces which define with one another a gap and which bound an interior space. One of the surfaces has a projecting portion extending across the gap toward the other of the surfaces. A diaphragm of resilient material has an inner portion spanning the interior space and has a first region of uniform thickness and an outer portion adapted to be clamped in the gap. The outer portion has a marginal second region spaced exteriorly of and is of greater thickness than the first region. There is a recessed third region intermediate of and of lesser thickness than both of the first and second regions in unclamped condition so as to bound with the first and second regions a three-sided recess in which the projecting portion is lodged. The recessed region has relatively lesser material than the other regions due to the lesser thickness of the recessed region, to thereby substantially reduce the tendency of the material of the recessed region to flow toward the outer regions when in clamped condition.

U.S. Pat. No. 4,353,243 (Martin) teaches a fluid pressure controlled diaphragm actuated multiport valve which includes a first plate having a multiplicity of control fluid inlet means passing through the first plate. Each of the control fluid inlet means is connectable to a source of control fluid under pressure and is under independent pressure control. There is a second plate assembled adjacent the first plate having a multiplicity of fluid conduit means passing through the second plate. Each of the fluid conduit means opens opposite a corresponding control fluid inlet means in the first plate. The second plate further has a multiplicity of operatively interconnected, low dead volume fluid channel means on its inner surface peripherally surrounding each of the fluid conduit means. A flexible diaphragm means is disposed between the first plate and the second plate when the plates are assembled adjacent one another. The diaphragm means are so arranged and constructed as to seal any fluid conduit means to fluid flow when the corresponding control fluid inlet means is open to control fluid under pressure. The channel means are in independent operative fluid flow connection with each of the fluid conduit means when the diaphragm is not in sealing position with respect to the fluid conduit means and are not in operative fluid flow connection with each of the fluid conduit means when the diaphragm is in sealing position. The channel means are so arranged and constructed as to maintain operative fluid flow connection between any of the fluid conduit means which are not sealed. There is means for holding the first plate. The second plate and the diaphragm are in assembled adjacent relationship.

U.S. Pat. No. 4,376,523 (Goyen) teaches an assembly which includes a header pipe having an internal flow passage, a wall with a sealing surface, and an aperture through the sealing surface into the flow passage. An outlet pipe is mounted to and passes through the wall, crosses the flow passage and has a threaded end. There is a diaphragm-type valve having a body which includes a peripheral skirt adapted to bear against the sealing surface and a web. A threaded tubular member supported by the web is threadedly engaged to the end of the outlet pipe and is operative to bring the skirt toward and against the sealing surface, thereby to mount the diaphragm-type valve to the header pipe. The web provides a fluid passage extending between the flow passage and the outlet pipe. The diaphragm-type valves are disposed outside of the header pipe. There is a fluid controlling position between the end of the outlet pipe and the fluid passage. There is also port means for admitting control pressure to the diaphragm, a peripheral seal means is disposed in a sealing manner between the skirt and the sealing surface.

BROAD DESCRIPTION OF THE INVENTION

An object of the invention is to provide a diaphragm valve, particularly for combination with a container of pressurized gas. A further object of the invention is to provide a combination of such diaphragm valve and a container for compressed gas. Other objects and advantages of the diaphragm valve of the invention are set out herein or are obvious herefrom to one ordinarily skilled in the art.

The objects and advantages of the invention are achieved by the diaphragm valve of the invention.

The invention involves a diaphragm valve for containers, such as cylinders, for pressurized gas. The diaphragm valve has an elongated member body having an elongated central passageway, and a flexible diaphragm positioned in and sealingly affixed to the sides of the elongated central passageway of the elongated body member. The diaphragm forms a first chamber and a second chamber in the elongated central passageway of the elongated body member. The plane of the diaphragm is approximately perpendicular to the longitudinal axis of the elongated central passageway of the elongated body member. A valve stem is rotatably positioned in the first chamber in a manner whereby the valve stem can be moved toward or away from the diaphragm. The first end of the valve stem protrudes out of the first chamber. Means for rotating the valve stem is affixed on the first end of the valve stem. There is a port located in the side of the elongated member which communicates with the second chamber of the elongated member. There is also a short member, having a central passageway, which has its first end affixed in the port. The second end of the short member is adapted to be connected to a source of pressurized gas. A second elongated member, having a central passageway, is positioned in the second chamber of the first elongated member. The second end of the second elongated member is sealingly affixed to the second end opening of the first elongated member. The first end of the second elongated member forms a valve seat. The valve seat is positioned near but not in contact with the diaphragm. The end of the first elongated member corresponds to the second end port of the first elongated member and is adapted to be sealingly affixed to a container for compressed gas. There is a cup member having a central chamber which is open on one end and which has a flat bottom portion. The cup member is positioned in the first chamber of the first elongated member. The bottom portion of the cup member contacts or is capable of contacting the diaphragm. The second end of the valve stem is positioned in the central chamber of the cup member. The second end of the valve stem contacts, or is capable of contacting, the flat bottom portion of the cup member. There is a route of communication from the second end of the short member through the central passageway of the short member, the second chamber of the first elongated member and the central passageway of the second elongated member to the second end of the second elongated member. The diaphragm valve is capable of being moved into a closed position by rotating the valve stem inwardly, thereby the flat bottom portion of the cup member sealingly pressses the diaphragm against the valve seat of the second elongated member and whereby the route of communication is sealingly interrupted.

Preferably the elongated member is a tube, and the valve seat is formed by the first end of the elongated member having been outwardly rolled over. Preferably the elongated body member is a tube. The elongated body member is preferably composed of a first tube member and a second tube member joined together. Preferably the diaphragm is sealingly affixed around its rim by means of the joint between the first tube member and the second tube member.

Preferably the valve stem has a longitudinal passageway and a rotatable shaft being located in the longitudinal passageway. A flat ring is preferably mounted around the lower end of the shaft. The bottom of the flat ring contacts the top of the flat bottom of the cup-shaped member and the top of the flat ring contacting the bottom surface of the lower end of the valve stem.

In a very preferred embodiment of the invention, a diaphragm valve, a rim is positioned inside of the central passageway of the second elongated member. The rim has a central passageway. The rim is positioned near the first end of the second elongated member. The first end of a coil spring contacts the diaphragm. The portion of the coil spring near the second end of the coil spring is positioned in the portion of the central passageway of the second elongated member corresponding to the first end of the first elongated member. The second end of the coil spring contacts the rim. The coil spring normally holds the diaphragm in the open position. Before the initial filling, many users draw a vacuum on the cylinders to be filled with compressed gases or various other products. The spring is of sufficient load to assure that the diaphragm does not seal off the container prior to reaching the desired vacuum in the cylinder, when the valve is in the open position. In the closed position, sufficient torque for closing must be applied to overcome the spring load and apply sufficient sealing load.

The invention involves, in combination, a container for pressurized gas and a diaphragm valve, said container having a port in the wall thereof. The diaphragm valve has an elongated member body having an elongated central passageway, and a flexible diaphragm positioned in and sealingly affixed to the sides of the elongated central passageway of the elongated body member. The second end opening of the elongated member is axially aligned with the port of the container. The diameter of the central passageway of the elongated central passageway is greater than the diameter of the port of the container. The second end of the elongated member is an outwardly extending surface which is sealingly affixed to the outside surface of the wall of the container around the port of the container. The diaphragm forms a first chamber and a second chamber in the elongated central passageway of the elongated body member. The plane of the diaphragm is approximately perpendicular to the longitudinal axis of the elongated central passageway of the elongated body member. A valve stem is rotatably positioned in the first chamber in a manner whereby the valve stem can be moved toward or away from the diaphragm. The first end of the valve stem protrudes out of the first chamber. Means for rotating the valve stem is affixed on the first end of the valve stem. There is a port located in the side of the elongated member which communicates with the second chamber of the elongated member. There is also a short member having a central passageway, which has its first end affixed in the port. The second end of the short member is adapted to be connected to a source of pressurized gas. A second elongated member having a central passageway, is positioned in the second chamber of the first elongated member. The second end of the second elongated member extends through the port of the container. The second end of the second elongated member is an outward extending surface which is sealingly affixed to the inside of the wall of the container around the port of the container. The first end of the second elongated member forms a valve seat. The valve seat is positioned near but not in contact with the diaphragm. The end of the first elongated member corresponds to the second end port of the first elongated member and is adapted to be sealingly affixed to a container for compressed gas. There is a cup member having a central chamber which is open on one end and which has a flat bottom portion. The cup member is positioned in the first chamber of the first elongated member. The bottom portion cup member contacts or is capable of contacting, the diaphragm. The second end of the valve stem is positioned in the central chamber of the cup member. The second end of the valve stem contacts, or is capable of contacting, the flat bottom portion of the cup member. There is a route of communication from the second end of the short member through the central passageway of the short member, the second chamber of the first elongated member and the central passageway of the second elongated member to the second end of the second elongated member. The diaphragm valve is capable of being moved into a closed position by rotating the valve stem inwardly, whereby the flat bottom portion of the cup member sealingly presses the diaphragm against the valve seat of the second elongated member and thereby the route of communication is sealingly interrupted.

In a very preferred embodiment of the invention, a diaphragm valve and a rim is positioned inside of the central passageway of the second elongated member. The rim has a central passageway. The rim is positioned near the first end of the second elongated member. The first end of a coil spring contacts the diaphragm. The portion of the coil spring near the second end of the coil spring is positioned in the portion of the central passageway of the second elongated member corresponding to the first end of the second elongated member. The second end of the coil spring contacts the rim. The coil spring normally holds the diaphragm in the open position.

Preferably the elongated member is a tube, and the valve seat is formed by the first end of the elongated member having been outwardly rolled over. Preferably the elongated body member is a tube. The elongated body member is preferably composed of a first tube member and a second tube member joined together. Preferably the diaphragm is sealingly affixed around its rim by means of the joint between the first tube member and the second tube member. Preferably the valve stem has a longitudinal passageway, and a rotatable shaft is located in the longitudinal passageway. A flat ring is preferably mounted around the lower end of the shaft. The bottom of the flat ring contacts the top of the flat bottom of the cup-shaped member and the top of the flat ring contacting the bottom surface of the lower end of the valve stem.

DETAILED DESCRIPTION OF THE INVENTION

Figure 1:
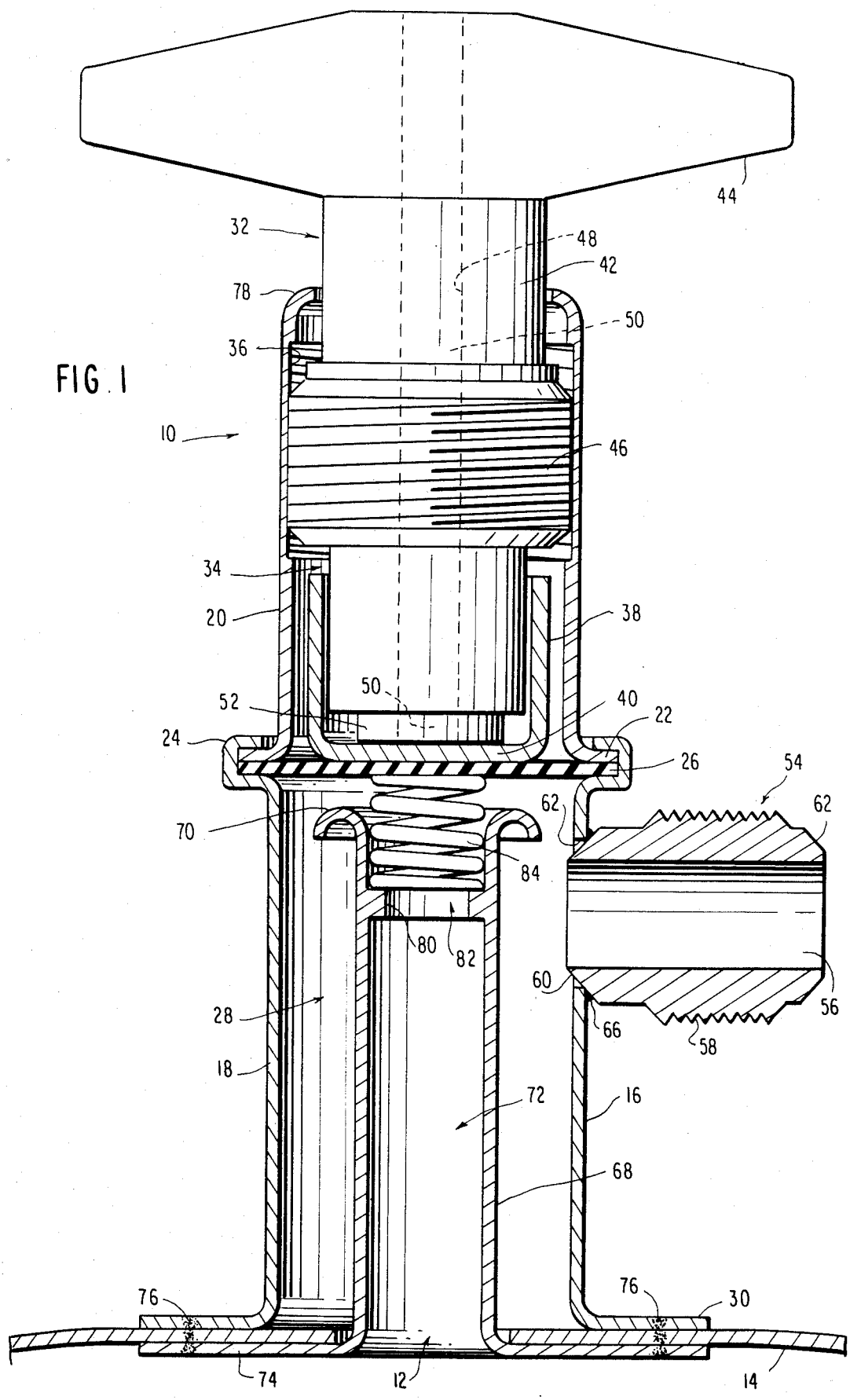
FIG. 1 is a partially cut-away, front elevational view of the diaphragm valve, incorporating a spring, of the invention.

In FIG. 1, diaphragm valve 10 is fixedly mounted in entrance port 12 of cylinder 14 (partially shown). Valve 10 has outer tube member 16 composed of lower tube segment 18 and upper tube segment 20. Outer tube member 16 can have any shaped cross-section, but a circular cross-section is preferred. Lower edge 22 of upper tube segment 20 is a flat, outwardly extending rim. Upper edge 24 of lower tube segment 18 is an inwardly-facing, outwardly-extending U-shaped portion. The rim of diaphragm 26 fits in and tightly against the U-shaped upper edge 24. Lower rim 22 fits on top of the edge portion of diaphragm 26 and in U-shaped upper edge 24. U-shaped upper edge 24 has been crimped so as to tightly hold diaphragm 26 and upper tube segment 20 in place and to seal the rim of diaphragm 26 in reaction to the interior portion (chamber 28) of lower tube segment 18.

Most of the lower portion of valve stem 32 is positioned inside (chamber 34) of upper tube portion 20. About the upper half of the inside wall surface of upper tube portion 20 is internally threaded 36. Cup 38 is positioned in chamber 34 with its open end facing upward and its flat bottom 40 in contact with the top surface of diaphragm 26. Valve stem 32 has main stem 42, handle 44 connected to the top of main stem 42 and externally-threaded sleeve 46 mounted around the middle portion of main stem 42. Externally-threaded sleeve 46 is threadingly engaged with internally-threaded portion 36 of upper tube portion 20. Main stem 42 and handle 44 contain vertical passageway 48, which has a circular cross-section. Cylindrical shaft 50 slidably fits within passageway 48. Cylindrical ring 52 is affixedly mounted on the lower end of cylindrical shaft 50 which extends below the end of main shaft 42. The bottom side of cylindrical ring 52 is flat and contacts the inside surface of bottom 40 of cup 38. Shaft 50 and ring 52 are preferably constructed as one piece. Diaphragm 26 is held taut enough and has strength not to be appreciably depressed by the weight of cup 38, center shaft 50 and ring 52. Upper edge 78 is inwardly crimped to prevent removal of valve stem 32 from chamber 34.

Spud 54 is an elongated member having longitudinal central bore 56. Spud 54 is externally threaded (58) in its middle portion. Both end rims (60, 62) of spud 54 are outwardly slanted. Bevelled rim 60 of spud 54 is mounted in circular port 64 located in the upper wall region of lower tube segment 18. Port 62 is slightly smaller in diameter than circular bevelled rim 60. Projection weld 66 holds spud 54 in place and helps seal the interface of bevelled rim 60 and the outer edge of port 64. External threads 58 allow a source of compressed gas (not shown) to be attached to spud 54 in order to deliver compressed gas to cylinder 14.

Inner tube member 68 is positioned within chamber 28 of lower tube segment 18. Upper edge 70 of inner tube member 68 is outwardly flaired out and over to form a rounded valve seat for diaphragm 26. Inner tube member 68 has inner passageway 72. The lower end of inner tube member extends through port 12 of cylinder and forms lip 74. Lip 74 is an outwardly-extending essentially-flat portion which mates with the inside surface of slightly inwardly-curved top portion of cylinder 14. Lower lip 30 of lower tube segment 18 is an outwardly-extending essentially-flat portion which mates with the outside surface of the slightly-curved top portion of cylinder 14. Double projection weld 76 is used to fixedly attach lower lip 30 and lower lip 30 to cylinder 14 in a sealed manner.

Internal rim 80 (with internal passageway 82) is located on the outside surface of inner tube member 68 slightly below edge 70. Also, edge 70 of inner tube member 68 is located close to, but does not contact, the bottom surface of diaphragm 26 (when diaphragm 26 is in its normal or open position). Coil spring 84 is positioned in the upper end of inner tube 68, resting on rim 80 and contacting diaphragm 26. Flexible diaphragm 26 is mounted above valve seat 70 and must be forced downward out of its normal horizontal orientation against the valve seat by turning valve stem 42 so as to rotate downwardly in order to effect closure. Diaphragm valve 10 does not require spring 84 to maintain diaphragm 26 in the open position, except in some instances when a vacuum has been pulled on the interior of gas cylinder 14.

The diaphragm valve of the invention has a broad scope of usage, but is specifically intended for use on cylinders for shipment of compressed gases. The design and construction of diaphragm valve 10 provides improved features at substantial reduced costs. In the full open position, the operation of diaphragm valve 10 allows fluid to enter or exit through the port 56, which communicates with chamber 28 between valve body 18 and valve seat body 68 which in turn communicates with cylinder 14 via chamber 72 of valve seat body 68. Spring 84 is positioned in the top portion of center passageway 72 of valve seat body 68, with its bottom portion seated on rim 80 inside of central passageway 72 of valve seat body 68 and with its top rim pressing against diaphragm 26. Before the initial filling of cylinder 14, a vacuum can be drawn on cylinder 14 so as to be filled with load (strength) to assure diaphragm 26 does not seal off cylinder 14 prior to reaching the desired vacuum in cylinder 14 when valve 10 is in the open position. In the closed position, sufficient torque for closing must be applied to overcome the spring load and to apply sufficient sealing load. To effect shut-off, stem 36 is turned to overcome spring 84 and to cause flexible diaphragm 26 to become sealed on valve seat 70. Such action causes communication from port 56 in spud 54 and chamber 28 between valve body 18 and valve seat body 68 to be sealed off from the interior of cylinder 14.

There are a number of advantages of the invention diaphragm valve brought about other then by spring 84. The assembly lends itself readily to automation, thus resulting in reduced labor cost. Additional benefits to the user occur as a result of increased flow rates through the valve allowing for faster improved sealing characteristics and the elimination of the dynamic O-Ring seal currently used in present designs which result in substantial leaker problems during valve operation. The invention diaphragm valve preferably uses projection welds and a crimping operation. Spud 54 can be produced as a screw machine part.

Lower tube segment 18, for example, has an internal diameter of $1\frac{1}{4}$ inches and a height of $2\frac{1}{2}$ inches from its bottom to the location of diaphragm 26. Diaphragm 26, for example, has a diameter of $1\frac{5}{8}$ inches and a thickness of diaphragm 26 preferably is composed of flexible, neoprene rubber. Diaphragm 26 is a simple die-cut diaphragm. U-shaped upper edge 24, for example, has a thickness of $\frac{1}{8}$ inch. Upper tube segment 20, for example, has an internal diameter of $1\frac{1}{8}$ inches and a height of about 2 inches from its bottom to the top of its crimped portion 78. Upper tube segment 20, lower tube segment 18, cup 38, and inner tube member 68 are preferably composed of a steel which can readily be produced with high-speed drawing equipment (for minimum use of labor and material). Stem handle 44 can be a molded plastic part which is designed for ease of molding and use of low cost plastic material. Inner tube member 68, for example, has an internal diameter of $\frac{1}{8}$ inch and a height of about $2\frac{1}{4}$ inches. Cup 38, for example, has an internal diameter of $\frac{7}{8}$ inches and a height of $1\frac{1}{4}$ inches.

Figure 2:
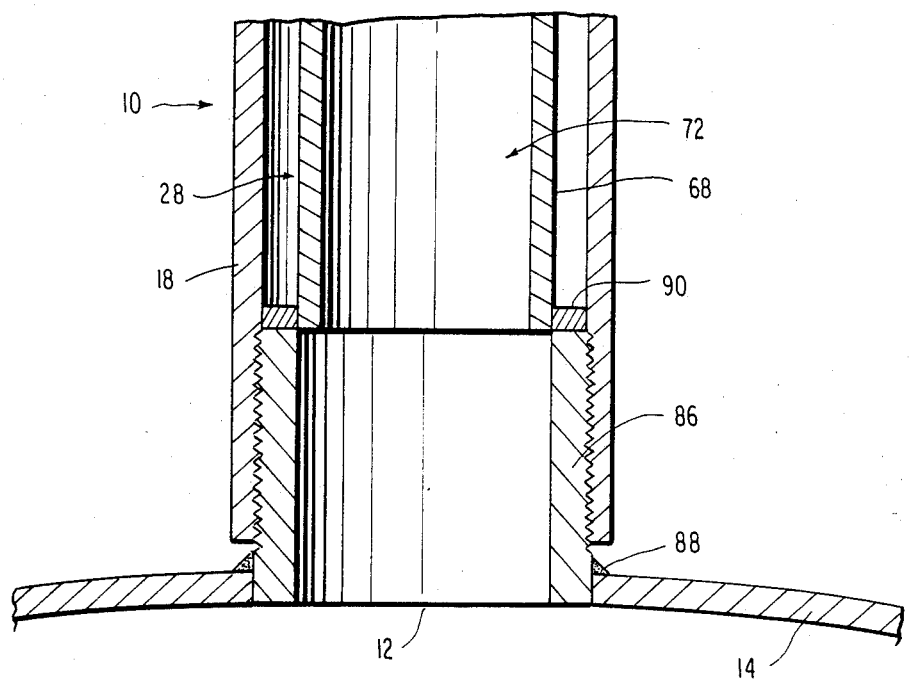
FIG. 2 is a cut-away front elevational view of one version of the portion of the diaphragm valve of FIG. 1 for attachment to a container for pressurized gas.

In FIG. 2, another attachment mode which is shown is diaphragm valve 10 to cylinder 14. Lower tube segment 18 of diaphragm valve 10 is internally threaded. Externally threaded short nozzle 86 is projection welded (88) into port 12 of cylinder 14. The bottom portion of lower tube segment 18 is threaded on to externally threaded nozzle 86. Inner tube member 68 is positioned inside of lower tube segment 18 so as to form outer chamber 28 and inner chamber 72. The lower edge of inner tube member 68 extends to the top rim of nozzle 86. Flat ring 90 is interspaced between lower tube segment 18 and inner member 68 and is sealingly affixed to both lower tube segment 18 and inner tube member 68. Bottom surface ring 90 fits flush against the top rim of nozzle 86.

What is claimed is:

1. Diaphragm valve for a container for pressurized gas, comprising:
   (a) an elongated member body having an elongated central passageway, said elongated central passageway having a first end opening and a second end opening;
   (b) a flexible diaphragm positioned in and sealingly affixed to the side of said elongated central passageway of elongated body member (a), thereby forming a first chamber and a second chamber in said elongated central passageway of elongated body member (a), said first chamber corresponding to said first end opening, said second chamber corresponding to said second end opening, and the plane of diaphragm (b) being approximately perpendicular to the longitudinal axis of said elongated central passageway of elongated body member (a);
   (c) a valve stem rotatably positioned in said first chamber in a manner whereby valve stem (c) can be moved toward or away from diaphragm (b), valve stem (c) having a first end and a second end, said first end of valve stem (c) protruding out of said first chamber, and means for rotating valve stem (c) being affixed on said first end of valve stem (c);
   (d) a port located in the side of elongated member (a), said port communicating with said second chamber of elongated member (b);
   (e) a short member having a central passageway, short member (e) having a first end and a second end, said first end of short member being affixed in port (d), and said second end of short member (d) being adapted to be connected to a source of pressurized gas;
   (f) an elongated tubular member having a central passageway, elongated member (f) having a first end and a second end, elongated member (f) being positioned in said second chamber of elongated member (a), said second end of elongated member (f) being sealingly affixed to said second end opening of elongated member (a), the first end of elongated member (f) having been outwardly rolled over to form a valve seat, and said valve seat being positioned near but not in contact with diaphragm (b), wherein a rim is positioned inside of said central passageway of elongated member (f), said rim having a central passageway, said rim being positioned near said first end of elongated member (f), and wherein there is a coil spring having a first end and a second end, said first end of said coil spring contacting diaphragm (b), the portion of said coil spring near said second end of said coil spring being positioned in the portion of said central passageway of elongated member (f) corresponding to said first end of elongated member (f), and said second end of said coil spring contacting said rim, said coil spring normally holding diaphragm (b) in the open position;
   (g) the end of elongated member (a) corresponding to said second end port of elongated member (a) being adapted to be sealingly affixed to a container for compressed gas; and
   (h) a cup-shaped member having a central chamber which is open on one end and which has a flat bottom portion, cup-shaped member (h) being positioned in said first chamber of elongated member (a), said bottom portion of cup-shaped member (h) contacting, or being capable of contacting, diaphragm (b), said second end of valve stem (c) being positioned in said central chamber of cup-shaped member (h), said second end of valve stem (c) contacting, or being capable of contacting, said flat bottom portion of cup-shaped member (h), there being a route of communication from said second end of short member (e) through said central passageway of short member (e), said second chamber of elongated member (f) to said second end of elongated member (f), said diaphragm valve being capable of being moved into a closed position by rotating valve stem (c) inwardly whereby said flat bottom portion of cup-shaped member (h) sealingly presses diaphragm (b) against said valve seat of elongated member (f) and thereby said route of communication is sealingly interrupted.

2. Diaphragm valve as claimed in claim 1 wherein elongated member (a) is a tube.

3. Diaphragm valve as claimed in claim 1 wherein elongated member (a) is composed of a first tube member asd a second tube member joined together.

4. Diaphragm valve as claimed in claim 5 wherein diaphragm (b) is sealingly affixed around its rim by means of the joint between said first tube member and said second tube member.

5. Diaphragm valve as described in claim 1 wherein valve stem (c) has a longitudinal passageway, a rotatable shaft being located in said longitudinal passageway, and a flat ring being mounted around the lower end of said shaft, the bottom of said flat ring contacting the top of the flat bottom of cup-shaped member (h) and the top of said flat ring contacting the bottom surface of the lower end of valve stem (c).

6. In combination, a container for pressurized gas and a diaphragm valve, said container having a port in the wall thereof, the diaphragm valve comprising:
   (a) an elongated member body having an elongated central passageway, said elongated central passageway having a first end opening and a second end opening, said second end opening of said elongated member being axially aligned with said port of said container, the diameter of said central passageway of said elongated member body being greater than the diameter of said port of said container, the second end of said elongated member being an outwardly extending surface which is sealingly affixed to the outside surface of the wall of said container around said port of said container;
   (b) a flexible diaphragm positioned in and sealingly affixed to the sides of said elongated central passageway of elongated central passageway of elongated body member (a), thereby forming a first chamber and a second chamber in said elongated central passageway of elongated body member (a), said first chamber corresponding to said first end opening, said second chamber corresponding to said second end opening, and the plane of diaphragm (b) being approximately perpendicular to the longitudinal axis of said elongated central passageway of elongated body member (a);
   (c) a valve stem rotatably positioned in said first chamber in a manner whereby valve stem (c) can be moved toward or away from diaphragm (b), valve stem (c) having a first end and a second end, said first chamber, and means for rotating valve stem (c) being affixed on said first end of valve stem (c);

(d) a port located in the side of elongated member (a), said port communicating with said second chamber of elongated member (b);

(e) a short member having a central passageway, short member (e) having a first end and a second end, said first end of short member being affixed in port (d), and said second end of short member (d) being adapted to be connected to a source of pressurized gas or a cap;

(f) an elongated tubular member having a central passagway, elongated member of (f) having a first end and a second end, elongated member (f) being positioned in said second chamber of elongated member (a), said second end of elongated member (f) extending through said port of said container, the second end of said elongated member (f) being an outward extending surface which is sealingly affixed to the inside of the wall of said container around said port of said container, the first end of elongated member (f) having been outwardly rolled over to form a valve seat, and said valve seat being positioned near but not in contact with diaphragm (b), wherein a rim is positioned inside of said central passageway of elongated member (f), said rim having a central passageway, said rim being positioned near said first end of elongated member (f), and wherein there is a coil spring having a first end and a second end, said first end of said coil spring contacting diaphragm (b), the portion of said coil spring near said second end of said coil spring being positioned in the portion of said central passageway of elongated member (f), and said second end of said coil spring contacting said rim, said coil spring normally holding diaphragm (b) in the open position;

(g) the end of elongated member (a) corresponding to said second end port of elongated member (a) being adapted to be sealingly affixed to a container for compressed gas; and (h) a cup-shaped member having a central chamber which is open on one end and which has a flat bottom portion, cup-shaped member (h) being positioned in said first chamber of elongated member (a), said bottom portion of cup-shaped member (h) contacting, or being capable of contacting, diaphragm (b), said second end of valve stem (c) being positioned in said central chamber of cup-shaped member (h), said second end of valve stem (c) contacting, or being capable of contacting, said flat bottom portion of cup-shaped member (h), there being a route of communication from said second end of short member (e) through said central passageway of short member (e), said second chamber of elongated member (a) and said central passageway of elongated member (f) to said second end of elongated member (f), said diaphragm valve being capable of being moved into a closed position by rotating valve stem (c) inwardly whereby said flat bottom portion of cup-shaped member (h) sealingly presses diaphragm (b) against said valve seat of elongated member (f) and thereby said route of communication is sealingly interrupted.

7. A diaphragm valve and container combination as claimed in claim 6 wherein elongated member (a) is a tube.

8. A diaphragm valve container combination as claimed in claim 6 wherein elongated member (a) is composed of a first tube member and a second tube member joined together.

9. A diaphragm valve and container combination as claimed in claim 8 wherein diaphragm (b) is sealingly affixed around its rim by means of the joint between said first tube member and said second tube member.

10. A diaphragm valve and container combination as claimed in claim 6 wherein valve stem (c) has a longitudinal passageway, a rotatable shaft being located in said longitudinal passageway, and a flat ring being mounted around the lower end of said shaft, the bottom of said flat ring contacting the top of the flat bottom of cup-shaped member (h) and the top of said flat ring contacting the bottom surface of the lower end of valve stem (c).

11. In combination, a container for pressurized gas and a diaphragm valve, said container having a port in the wall thereof, with an externally threaded short nozzle affixed therein, and the diaphragm valve comprising:

(a) an elongated member body having an elongated central passageway, said elongated central passageway having a first end opening and a second end opening, said second end opening of said elongated member being axially aligned with said port of said container, the diameter of said central passageway of said elongated member body being greater than the diameter of said port of said container, the second end of said elongated member being threaded to fit the threads of said short nozzle and affixed to said container thereby;

(b) a flexible diaphragm positioned in and sealingly affixed to the sides of said elongated central passageway of elongated body member (a), thereby forming a first chamber and a second chamber in said elongated central passageway of elongated body member (a), said first chamber corresponding to said first end opening, said second chamber corresponding to said second opening, and the plane of the diaphragm (b) being approximately perpendicular to the longitudinal axis of said elongated central passageway of elongated body member (a);

(c) a valve stem rotatably positioned in said first chamber in a manner whereby valve stem (c) can be moved toward or away from diaphragm (b), valve stem having a first end and a second end, said first end of valve stem (c) protruding out of said first chamber, and means for rotating valve stem (c) being affixed on said first end of valve stem (c);

(d) a port located in the side of elongated member (a), said port communicating with said second chamber of elongated member (b);

(e) a short member having a central passageway, short member (e) having a first end and a second end, said first end of short member being affixed in port (d), and said second end of short member (d) being adapted to be connected to a source of pressurized gas or a cap;

(f) an elongated tubular member having a central passageway, elongated member (f) having a first end and a second end, elongated member (f) being positioned in said second chamber of elongated member (a), said second end of elongated member (f) extending to the top rim of said short nozzle, with a flat ring being interspaced between the exterior of elongated member (f) and the interior of elongated member (a), and fitting flush against the top rim of said short nozzle, wherein a rim is positioned inside of said central passageway of elongated member (f), said rim having a central passageway, said rim being positioned near said first end of elongated member (f), and wherein there is a coil spring having a first end and a second end, said first end of said coil spring contacting diaphragm (b), the portion of said coil spring near said second of said coil spring being positioned in the portion of said central passageway of elongated member (f) corresponding to said first end of elongated member (f), and said second end of said coil spring contacting said rim, said coil spring normally holding diaphragm (b) in the open position, the first end of elongated member (f) having been outwardly roller over to form a valve seat, and said valve seat being positioned near but not in contact with diaphragm (b); and (g) a cup-shaped member having a central chamber which is open on one end and which has a flat bottom portion, cup-shaped member (h) being positioned in said first chamber of elongated member (a), said bottom portion of cup-shaped member (h) contacting, or being capable of contacting, diaphragm (b), said second end of valve stem (c) being positioned in said central chamber of cup-shaped member (h), said second end of valve stem (c) contacting, or being capable of contacting, said flat bottom portion of cup-shaped member (h), there being a route of communication from said second end of short member (e) through said central passageway of short member (e), said second chamber of elongated member (a) and said central passageway of elongated member (f) to said second elongated member (f), said diaphragm valve being capable of being moved into a closed position by rotating valve stem (c) inwardly whereby said flat bottom portion of cup-shaped member (h) sealingly presses diaphragm (b) against said valve seat of elongated member (f) and thereby said route of communication is sealingly interrupted.

* * * * *